United States Patent
Dropps

(10) Patent No.: US 10,554,334 B2
(45) Date of Patent: Feb. 4, 2020

(54) NOMINALLY UNGUARANTEED ERROR-DETECTION CODES FOR SUB-DATA PACKETS

(71) Applicant: Hewlett Packard Enterprise Development LP, Houston, TX (US)

(72) Inventor: Frank Dropps, Eagan, MN (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/786,291

(22) Filed: Oct. 17, 2017

(65) Prior Publication Data
US 2019/0116001 A1  Apr. 18, 2019

(51) Int. Cl.
*H04L 1/00* (2006.01)
*H04L 12/939* (2013.01)
*H04L 29/06* (2006.01)

(52) U.S. Cl.
CPC .......... *H04L 1/0041* (2013.01); *H04L 49/555* (2013.01); *H04L 69/22* (2013.01)

(58) Field of Classification Search
CPC ...... H04L 1/0041; H04L 69/22; H04L 49/555
See application file for complete search history.

(56) References Cited

U.S. PATENT DOCUMENTS

| | | | |
|---|---|---|---|
| 6,141,784 A * | 10/2000 | Davis | G08C 25/02 370/473 |
| 7,024,611 B2 | 4/2006 | Chen et al. | |
| 8,064,461 B2 | 11/2011 | Nishida et al. | |
| 8,386,892 B1 | 2/2013 | Jamieson et al. | |
| 9,203,441 B2 | 12/2015 | Angelopoulos et al. | |
| 9,244,759 B2 | 1/2016 | Blumrich et al. | |
| 9,503,220 B2 | 11/2016 | Naaman et al. | |
| 2005/0058154 A1 * | 3/2005 | Lee | H04L 1/0066 370/473 |
| 2011/0154143 A1 * | 6/2011 | Eckert | H04L 1/1812 714/748 |
| 2011/0239088 A1 * | 9/2011 | Post | G06F 11/1068 714/763 |

(Continued)

OTHER PUBLICATIONS

Xie, J. et al., "Revisiting Partial Packet Recovery in 802.11 Wireless LANs", MobiSys'11, Jun. 2 Jul. 1, 2011, Bethesda, Maryland, USA. 13 pp.

*Primary Examiner* — Thien Nguyen
(74) *Attorney, Agent, or Firm* — Hewlett Packard Enterprise Patent Department

(57) ABSTRACT

A transmitting device generates a nominally unguaranteed error-detection code for each sub-data packet of a data packet, and a nominally guaranteed error-detection code for the data packet. The transmitting device transmits to a receiving device the data packet including the sub-data packets thereof, the nominally guaranteed error detection codes for the sub-data packets, and the nominally guaranteed error-detection code for the data packet. For each sub-data packet, the receiving device uses the nominally unguaranteed error-detection code for each sub-data packet to determine whether the sub-data packet is erroneous. In response to determining that no sub-data packet is erroneous, the receiving device uses the nominally guaranteed error-detection code for the data packet to determine whether the data packet is erroneous.

14 Claims, 2 Drawing Sheets

(56) References Cited

U.S. PATENT DOCUMENTS

| | | | |
|---|---|---|---|
| 2012/0008532 A1* | 1/2012 | Miyoshi | H04L 1/1819 370/310 |
| 2014/0143634 A1* | 5/2014 | Post | G06F 11/1068 714/764 |
| 2016/0212507 A1 | 7/2016 | Du et al. | |
| 2018/0089137 A1* | 3/2018 | Ooi | G06F 13/4282 |

* cited by examiner

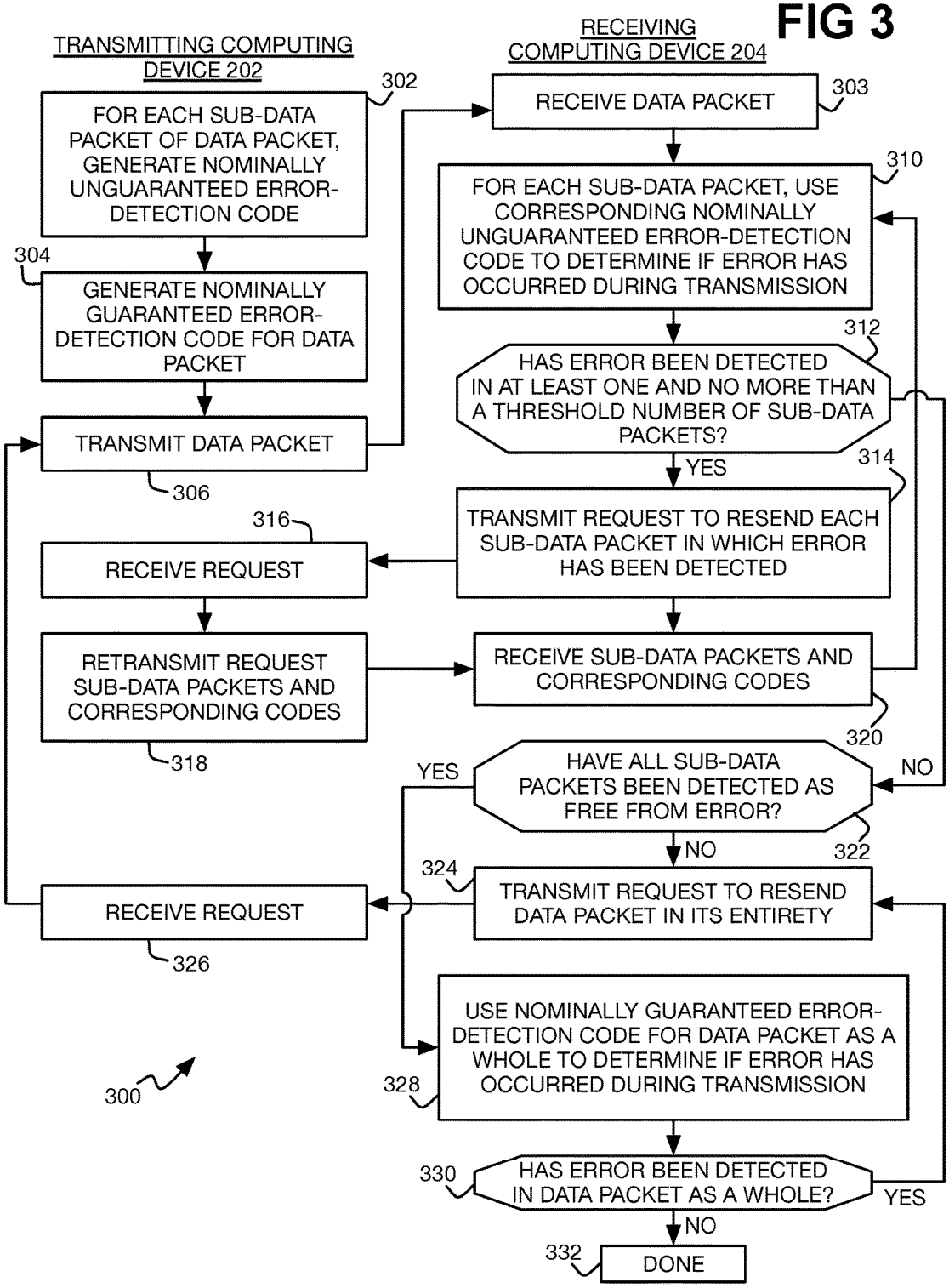

NOMINALLY UNGUARANTEED ERROR-DETECTION CODES FOR SUB-DATA PACKETS

BACKGROUND

In many computing, networking, and other technology applications, two hardware devices have to communicate with one another. Such communication occurs over a variety of different communication links. Although communication links are usually designed to value error-free communication as well as communication performance, no communication link may be considered perfect, and errors in data transmitted from a transmitting device to a receiving device over a communication link can occur, even if infrequently.

BRIEF DESCRIPTION OF THE DRAWINGS

FIG. 3 is a flowchart of a method by which a transmitting device like that in FIG. 2 transmits data packets like that of FIG. 1 to a receiving device like that in FIG. 2.

DETAILED DESCRIPTION

Figure 1:
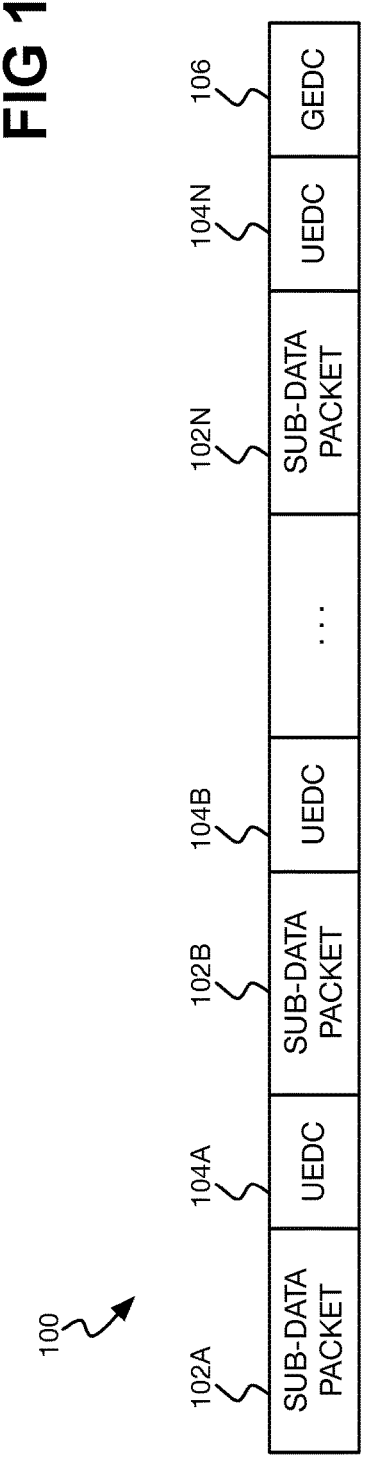
FIG. 1 is a diagram of an example data packet having sub-data packets, a nominally guaranteed error-detection code for the data packet as a whole, and a nominally unguaranteed error-detection code for each sub-data packet.

As noted in the background, communication links over which data is transmitted from one hardware device to another may generally provide for error-free communication of data, but data errors may nevertheless be introduced during communication, even if infrequently. Such errors can include a logic one bit being received when a logic zero bit was sent, and a logic zero bit being received when a logic one bit was sent, for instance. Even infrequent data communication errors can cause significant consequences. For example, communication errors within data that represents an executable computer program may result in the computer program being unable to run.

To permit the detection of errors during data communication, data can be divided into a number of data packets, and an error-detection code generated and transmitted for each data packet. The error-detection code for a data packet is generated from the data of the data packet. A transmitting device thus generates an error-detection code from the data that it is transmitting within a data packet, and sends the code to a receiving device along with the data packet. The receiving device uses the error-detection code and the data packet received from the transmitting device over a communication link to determine if an error occurred during transmission. If the receiving device concludes that an error was introduced within the data during transmission, it requests that the transmitting device resend the data packet.

Packetizing data into data packets introduces overhead within each data packet, in the form of headers, and so on. One way to increase data throughput, particularly for high-bandwidth communication links and communication links that are less prone to erroneous data communication, is therefore to increase the size of each data packet. However, increasing packet size can significantly decrease performance when errors do occur during data packet transmission. This is because the receiving device will request that the transmitting device retransmit an entire data packet, even if just one bit of the data packet is in error. That is, the receiving device has no way of pinpointing where the error within the data packet has occurred, and request that the transmitting device retransmit just this portion of the packet. A data packet (as well as a sub-data packet, as described later in the detailed description), can include information such as processor instructions, commands, status information, configuration information, device health information, link training information, link flow control information, operand data, and so on.

Techniques described herein ameliorate this and other shortcomings. A data packet can be divided into a number of sub-data packets. For the data packet as a whole, a nominally guaranteed error-detection code is generated. This error-detection code is nominally guaranteed in that if an error is introduced during data transmission, it is nearly 100% certain that the receiving device will detect the error by using the error-detection code.

Furthermore, for each sub-data data packet, a nominally unguaranteed error-detection code is generated. Each such error-detection code is nominally unguaranteed in that if an error is introduced during data transmission, it is likely but may not approach 100% certainty that the receiving device will detect the error using the error-detection code. Stated another way, whereas a nominally guaranteed error-detection code practically guarantees that data transmission errors will be detected, a nominally unguaranteed error-detection code does not provide such a guarantee.

The usage of multiple nominally unguaranteed error-detection codes per data packet, equal in number to the number of sub-data packets into which the data packet has been divided, and one nominally guaranteed error-detection code per data packet, permits more granular identification of the location in which an error has been introduced into a data packet without adding undue overhead to the data packet that is unnecessary when no errors occur.

For instance, a 4,000-byte data packet may be divided into eight 500-byte sub-data packets. If an error is introduced in just the second sub-data packet during transmission, the receiving device may be able to detect that the error occurred specifically in the second sub-data packet, as opposed to just more generally within the data packet as a whole. Therefore, the receiving device, instead of requesting retransmission of the entire 4,000-byte data packet, can request retransmission of just the second 500-byte sub-data packet.

Specifically so that undue overhead is not added to the data packet that is unnecessary when no errors occur, the nominally unguaranteed error-detection codes can be shorter in length than the nominally guaranteed error-detection code. For example, a sixteen-bit cyclic redundancy check (CRC) error-detection code is able to detect $$\frac{2^{16}-1}{2^{16}} = 99.998\%$$

of all possible data transmission errors, which may be considered nominally guaranteed. By comparison, a two-bit CRC error detection code is able to detect just $$\frac{2^2-1}{2^2} = 75\%$$

of all possible data transmission errors, which may be considered nominally unguaranteed. However, insofar as the vast majority of data packets are likely to be transmitted error-free, the three in four odds of detecting an error introduced in a particular sub-packet of data when a transmission error does occur in this sub-data packet may be considered as a reasonable tradeoff for the extra overhead of the sixteen bits of additional error detection code (two bits per sub-data packet, for eight sub-data packets in total).

Furthermore, when a transmission error is not detected within a particular sub-data packet, the nominally guaranteed error-detection code for the data packet as a whole ensures that the error will still be detected. Therefore, the worst case is that the receiving device will request retransmission of the entire data packet when an error occurs during data packet transmission, but this is no worse than what occurs without the usage of nominally unguaranteed error-detection codes for sub-data packets. However, the best case, which is more likely to occur by three-to-one odds for a particular sub-data packet, is that the receiving device will just have request retransmission of the particular sub-data packet in which the error occurred during transmission.

The usage of nominally unguaranteed error-detection codes for sub-data packets and which are shorter in length than the nominally guaranteed error-detection code for a data packet, in other words, ensures there is a good chance that the actual sub-data packet in which a transmission error occurs will be detected, while providing a failsafe that a transmission error occurring within the data packet as a whole will be detected. Furthermore, such usage of nominally unguaranteed error-detection codes in addition to a nominally guaranteed error-detection code presents a reasonable tradeoff by limiting the amount of extra overhead, in terms of the amount of extra bits that has to be transmitted, within the data packet as a whole. In the example that has been described, in which a sixteen-bit nominally guaranteed error-detection code is supplemented by eight two-bit nominally unguaranteed error-detection codes, the amount of data dedicated to error detection within a packet in effect just doubles, while providing a likely reduction in the amount of data that will be requested for retransmission when an error does occur by a factor of eight.

By comparison, simply making the data packets smaller by a factor of eight would result in an increase in the amount of data dedicated to error detection by a factor of eight. That is, employing eight 500-byte data packets instead of one 4,000-byte data packet having eight 500-byte sub-data packets results in the usage of eight sixteen-bit nominally guaranteed error-detection codes, instead of one sixteen-bit nominally guaranteed error-detection code and eight two-bit nominally unguaranteed error-detection codes. As such, in the example that has been described, on a per-data packet basis there is a savings $$\frac{8 \times 16 - (16 + 8 \times 2)}{8 \times 16} = 75\%$$

of reduction in the amount of data dedicated for error-detection purposes, which is not inconsequential particularly when transmitting large amounts of data.

FIG. 1 shows an example data packet 100. The data packet 100 is divided into multiple sub-data packets 102A, 102B, . . . , 102N, which are collectively referred to as the sub-data packets 102. The sub-data packets 102 can be of the same size, and there are at least two sub-data packets 102. There are nominally unguaranteed error-detection codes 104A, 104B, . . . , 104N, which are collectively referred to as the nominally unguaranteed error-detection codes 104, for the sub-data packets 102, such that there is one error-detection code 104 for each sub-data packet 102. For instance, the nominally unguaranteed error-detection code 104A corresponds to and is for the sub-data packet 102A, the unguaranteed error-detection code 104B corresponds to and is for the sub-data packet 102B, and the error-detection code 104C corresponds to and is for the sub-data packet 102C.

There is also a nominally guaranteed error-detection code 106 for the data packet 100 as a whole. The data packet 100 includes the sub-data packets 102, and can be said to include the nominally unguaranteed error-detection codes 104 as well. The data packet 100 may have a header or a footer, which can be part of one of the sub-data packets 102, or may be separate from the sub-data packets 102. Each nominally unguaranteed error-detection code 104 is generated from the data of its corresponding sub-data packet 102. The nominally guaranteed error-detection code 106 is generated from at least the data of the sub-data packets 102, and can be generated from the data of the sub-data packets as well as from the nominally unguaranteed error-detection codes 104 in combination.

Each nominally unguaranteed error-detection code 104 is nominally unguaranteed in that, when a received version of the corresponding sub-data packet 102 differs from a transmitted version of this sub-data packet 102, the error-detection code 104 for this sub-data packet 102 does not nominally guarantee that its usage will be able to detect the error. For instance, when the received version of the sub-data packet 102 differs from the transmitted version of the sub-data packet 102, the likelihood that a receiving device will fail to detect this error using the error-detection code 104 is greater than a threshold, such as one percent, five percent, ten percent, and so on. As such, usage of a nominally unguaranteed error-detection code 104 to detect an error in the received version of a sub-data packet 102 means that the likelihood that the received version of the sub-data packet 102 differs from the transmitted version of the sub-data packet 102 without detecting the error using the error-detection code 104 is greater than this threshold. Stated another way, the likelihood that usage of a nominally unguaranteed error-detection code 104 will fail to detect an error in transmission of a corresponding sub-data packet 102 is greater than the threshold.

By comparison, the nominally guaranteed error-detection code 106 is nominally guaranteed in that, when a received version of the data packet 100 differs from a transmitted version of the data packet 100, the error-detection code 106 nominally guarantees that its usage will be able to detect the error. For instance, when the received version of the data packet 100 differs from the transmitted version of the data packet 100, the likelihood that a receiving device will fail to detect this error using the error-detection code 106 is less than a threshold, such as one percent. As such, usage of a nominally guaranteed error detection code 106 to detect an error in the received version of a sub-data packet 102 means that the likelihood that the received version of the data packet 100 differs from the transmitted version of this data packet 100 without detecting this error using the error-detection code 106 is less than this threshold. Stated another way, the likelihood that usage of a nominally guaranteed error-detection code 106 will fail to detect an error in transmission of a corresponding sub-data packet 106 is less than the threshold.

In one implementation, a nominally guaranteed detection code is one that detects more than 99% of all possible transmission errors. In this implementation, a nominally unguaranteed detection code is one that detects less than 99% of all possible transmission errors. More generally, then, a nominally guaranteed detection code may be one that detects more than a threshold percentage of transmission errors that occur, whereas a nominally unguaranteed detection code may be one that detects less than this threshold percentage of transmission errors that occur.

The size or length of each nominally unguaranteed error-detection code 104 is generally less than the size or length of the nominally guaranteed error-detection code 106. For instance, the nominally unguaranteed error-detection codes 104 and the nominally guaranteed error-detection code 106 may each be generated in the same manner, but the error-detection code 106 may be generated with higher precision, and thus greater size, than each error-detection code 104. As another example, the nominally unguaranteed error-detection codes 104 may each be generated using a technique, function, hash, or algorithm that is many-to-one, in that more than one unique sequence of data within a sub-data packet 102 can result in the same error-detection code 104 being generated. By comparison, the nominally guaranteed error-detection code 106 may be generated using a different technique, function, hash, or algorithm that is one-to-one, in that each unique sequence of data within the data packet 100 results in a different error-detection code 106 being generated. Examples of different types of error-detection codes 104 and 106 include CRC codes of varying bit lengths, including longitudinal redundancy check (LRC) values or codes; parity bits, which can be considered as single-bit CRC codes or vertical redundancy check (VRC) values or codes; two-dimensional parity check values; checksum values, including Adler-32 checksum values; and so on.

Figure 2:
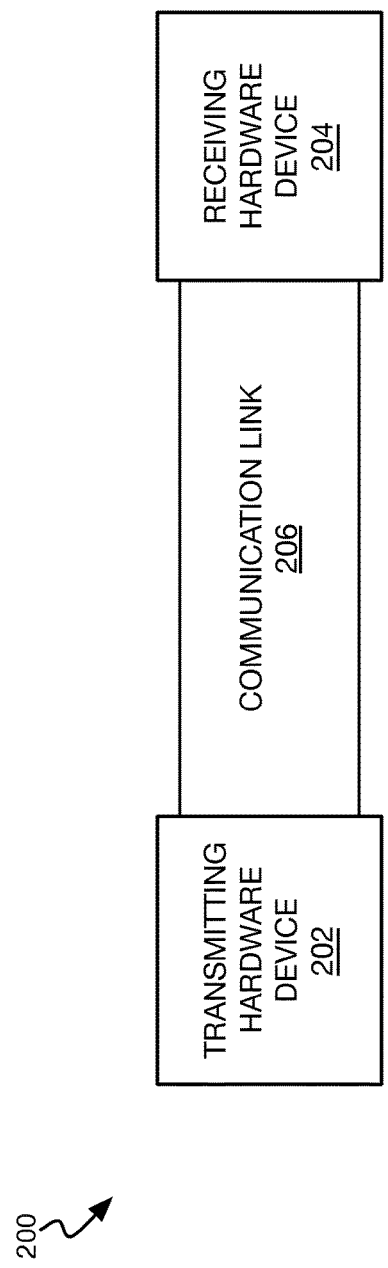
FIG. 2 is a diagram of a system in which a transmitting device can transmit data packets like that of FIG. 1 to a receiving device.

FIG. 2 shows an example system 200 in which data packets like the data packet 100 can be employed. The system 200 includes a transmitting hardware device 202 and a receiving hardware device 204 that are communicatively connected over a communication link 206 that is bidirectional. Each of the devices 202 and 204 may be a computing device, a network device, or another type of hardware device. For example, either or both of the devices 202 and 204 can be a desktop computer, a server computer, a laptop computer, a portable computing device like a smartphone, personal-digital assistance (PDA) device, or tablet computing device, and so on. As another example, either or both of the devices 202 and 204 can be a network switch device, a network router device, or another type of networking device. The communication link 206 may be or include a wired, optical, or wireless communication link.

In the example of FIG. 2, the device 202 is the transmitting device and the device 204 is the receiving device in that the device 202 sends data packets like the data packet 100 to the device 204. However, the receiving device 204 can also send packets back to the transmitting device 202, including at least to send requests for retransmission of data packets or sub-data packets that the device 202 already transmitted. The receiving device 204 may also send packets back to the transmitting device 202 to acknowledge receipt of data packets that the device 202 has transmitted. In general, the amount of data within or the number of the data packets that the transmitting device 202 sends to the receiving device 204 is greater than the amount of data within or the number of the packets that the receiving device 204 sends back to the transmitting device 202. However, in another implementation, each of the devices 202 and 204 can be both a transmitting device sending data packets like the data packet 100 and a receiving device receiving such data packets.

FIG. 3 shows an example method 300 in which the transmitting device 202 of FIG. 2 transmits data packets to the receiving device 204 of FIG. 2. The parts of the method 300 in the left column are performed by the transmitting device 202, and can be said to be implemented as code stored on a non-transitory data storage medium and executable by the device 202. As one example, the device 202 may be a computing device including a processor that executes the code, where the storage medium is separate from the processor. As another example, the device 202 may include an integrated circuit (IC), such as a field-programmable gate array (FPGA) or an application-specific IC (ASIC), which performs a sequence of steps in hardware. The parts of the method 300 in the right column are performed by the receiving device 204, and may similarly be implemented as code stored on a non-transitory data storage medium and executable by the device 204 or implemented in hardware.

For each sub-data packet of a data packet, the transmitting device 202 generates a nominally unguaranteed error-detection code from data of the sub-data packet (302). The transmitting device 202 also generates a nominally guaranteed error-detection code for the data packet as a whole, from data of the data packet (304), as has been described. The transmitting device 202 transmits the data packet, including the sub-data packets thereof, the nominally unguaranteed error-detection codes for the sub-data packets, and the nominally guaranteed error-detection code for the data packet, over the communication link 206 (306), which is then received by the receiving device 204 (303).

The sub-data packets may be transmitted in an interleaved manner in relation to their corresponding nominally unguaranteed error-detection codes, with each code transmitted after the sub-data packet to which it corresponds, as in FIG. 1, or with each code transmitted before the sub-data packet to which it corresponds. In another implementation, all the sub-data packets may be transmitted before or after all the sub-data packet's nominally unguaranteed error-detection codes have been transmitted. Furthermore, the nominally guaranteed error-detection code for the data packet as a whole may be transmitted before or after the sub-data packets and their nominally unguaranteed error-detection codes have been transmitted.

For each sub-data packet, the receiving device 204 uses the (received) corresponding nominally unguaranteed error-detection code to determine if an error occurred during transmission of the sub-data packet in question (310). In one implementation, the receiving device 204 uses the same technique that the transmitting device 202 did to generate the nominally unguaranteed error-detection code for a sub-data packet. However, whereas the transmitting device 202 generated the nominally unguaranteed error-detection code by applying a particular technique to the data of a sub-data packet, in this implementation the receiving device 204 applies the technique to both the (received) data of the sub-data packet and the (received) nominally unguaranteed error-detection code. If the result of this application by the receiving device 204 is zero (i.e., a series of logic zero bits), then no error has been detected in the sub-data packet in question. Stated another way, if the result of the application of the particular technique in question is zero, then the receiving device 204 does not detect an error in the sub-data packet using the nominally unguaranteed error-detection code for the sub-data packet. If the receiving device 204's application of the same particular technique that the transmitting device 202 used to generate the nominally unguaranteed error-detection code does not result in zero (i.e., one or more of a series of bits are logic one bits), then an error has been detected in the sub-data packet in question.

In another implementation, the receiving device 204 may apply the same technique that the transmitting device 202 did to generate the nominally unguaranteed error-detection code for a sub-data packet, but against (just) the (received) data of the sub-data packet. In this implementation, the receiving device 204 thus (re)generates the nominally unguaranteed error-detection code for the sub-data packet in question. If the nominally unguaranteed error-detection code that the receiving device 204 generated for a sub-data packet does not match the nominally unguaranteed error-detection code for the sub-data packet that the receiving device 204 received from the transmitting device 202, then an error has been detected in the sub-data packet in question. If, by comparison, the generated nominally unguaranteed error-detection code for a sub-data packet matches the received nominally unguaranteed error-detection code for the sub-data packet then no error has been detected in the sub-data packet in question.

Usage of the nominally unguaranteed error-detection code for a sub-data packet does not nominally guarantee that an error in the sub-data packet will be detected. That is, in the former implementation, a zero result when applying the same technique that was used to generate the nominally unguaranteed error-detection code, to both the data of a sub-data packet and the received nominally unguaranteed error-detection code does not nominally guarantee that there is no error in the sub-data packet. In the latter implementation, that the nominally unguaranteed error-detection code that the receiving device 204 generated for a sub-data packet matches the nominally unguaranteed error-detection code that the receiving device 204 received for this sub-data packet does not nominally guarantee that there is no error in the sub-data packet.

If the receiving device 204 has detected an error in at least one sub-data packet and no more than a threshold number of sub-data packets using the nominally unguaranteed error-detection codes for the sub-data packets in part 310 (312), then the receiving device 204 proceeds to part 314. Specifically, the receiving device 204 transmits a request to the transmitting device 202 to resend each sub-data packet in which the receiving device 204 detected an error using the nominally unguaranteed error-detection code for the sub-data packet (314). It is noted that the threshold number referenced in relation to part 312 may be equal to the total number of the sub-data packets of the data packet. In this case, regardless of the number of sub-data packets in which errors are detected in part 310 using the nominally unguaranteed error-detection codes for the sub-data packets, the receiving device 204 transmits a request to the transmitting device 202 to resend these particular sub-data packets.

In other implementations, however, the threshold number may not be equal to the total number of sub-data packets. For instance, the threshold number may be more than half and less than all the total number of sub-data packets, or at least one and less than half of the total number of sub-data packets, for instance. Setting the threshold number to less than all the sub-data packets controls the maximum number of sub-data packets in which errors are detected part 310 using the nominally unguaranteed error-detection codes for the sub-data packets that will trigger the receiving device 204 transmitting a request for just these sub-data packets in part 314.

When the receiving device 204 transmits a request in part 314, the transmitting device 202 receives this request (316). The transmitting device 202 then retransmits the requested sub-data packets and the corresponding nominally unguaranteed error-detection codes for these sub-data packets (318). The receiving device 204 receives the retransmitted sub-data packets and nominally unguaranteed error-detection codes (320), and proceeds back to part 310. However, in performing part 310 again, the receiving device 204 may determine whether there are errors just in the retransmitted sub-data packets, and similarly may consider just the retransmitted sub-data packets in part 312. That is, the receiving device 204 may not consider the sub-data packets that were previously received and in which no errors were previously detected.

Referring back to part 312, if the test in part 312 yields a negative answer, then one of two situations may have occurred. First, no error was detected in any sub-data packet using the nominally unguaranteed error-detection code for the sub-data packet. Second, errors were detected in more than the threshold number of the sub-data packets using the nominally unguaranteed error-detection codes for the sub-data packets. The latter can occur just if the threshold number is less than the total number of sub-data packets, however.

In the latter case, the receiving device 204 proceeds to transmit a request to the transmitting device 202 to retransmit the data packet in its entirety (324). That is, setting the threshold number to less than the total number of sub-data packets can correspond to a desire to have the data packet retransmitted in its entirety if more than this threshold number of sub-data packets have been detected as containing errors using their nominally unguaranteed error-detection codes. The transmitting device 202 receives this request (326), and the method 300 proceeds back to part 306.

However, if an error has not been detected in any sub-data packet using the sub-data packet's nominally unguaranteed error-detection code (322), then the receiving device 204 proceeds to use the received nominally guaranteed error-detection code for the data packet as a whole to determine whether an error occurred during transmission of the data packet (328). In one implementation, the receiving device 204 applies the same technique that the transmitting device 202 did to generate the nominally unguaranteed error-detection code. However, the transmitting device 202 applies the technique to the data of the data packet (i.e., the data of all the sub-data packets, and in one implementation the nominally unguaranteed error-detection codes for the sub-data packets as well). By comparison, the receiving device 204 applies the technique to both the data of the data packet and the received nominally guaranteed error-detection code. If the result is zero (i.e., a series of logic zero bits), then no error has been detected in the data packet using the nominally guaranteed error-detection code. By comparison, if the result is not zero (i.e., at least one bit in the series of bits is logic one), then an error has been detected in the data packet using the nominally guaranteed error-detection code.

In another implementation, the receiving device 204 (re)generates the nominally guaranteed error-detection code from the (received) data of the data packet. If the (re)generated nominally guaranteed error-detection code matches the nominally guaranteed error-detection code that the receiving device 204 received from the transmitting device 202, then no error is detected in the data packet using the nominally guaranteed error-detection code. By comparison, if the (re)generated nominally guaranteed error-detection code does not match the received nominally guaranteed error-detection code, then an error is detected in the data packet using the nominally guaranteed error-detection code in this implementation.

It is noted that in the example of FIG. 3, the receiving device 204 uses the nominally guaranteed error-detection code to determine if there is an error in the data packet as a whole just if the device 204 did not detect an error in any sub-data packet using the nominally unguaranteed error-detection code for the sub-data packet in part 310. In this implementation, if an error is detected in even one sub-data packet, then the nominally guaranteed error-detection code is not used to determine whether there is an error in the data packet, until all the sub-data packets have been received without error, albeit nominally unguaranteed. In one implementation, the receiver does not wait until the complete data packet is received before requesting retransmission of sub-data packet once an error has been detected. That is, the receiving device 204 uses the nominally guaranteed error-detection code as a nominally guaranteed confirmation that no errors have been introduced in the data packet, after the device 204 has used the nominally unguaranteed error-detection codes as an initial, nominally unguaranteed determination that no errors have occurred.

If no error has been detected in the data packet as a whole using the nominally guaranteed error-detection code (330), then the method 300 is finished (332). The receiving device 204 can be nominally guaranteed that no errors have been introduced in the received data packet. The receiving device 204 may send an acknowledgment to the transmitting device 202 that the data packet has been received without error. However, if an error has been detected in the data packet using the nominally guaranteed error-detection code (330), then the receiving device 204 proceeds back to part 324, and transmits a request to the transmitting device 202 to retransmit the data packet in its entirety, as has been described. In this case, the method 300 proceeds as has been described above.

The techniques described herein provide for more precisely locating where in a data packet an error has been detected, on a sub-data packet basis. As such, just the sub-data packets that have had errors detected therein during transmission have to be retransmitted. However, to minimize the amount of data that has to be transmitted for the error-detection codes corresponding to the sub-data packets, these error-detection codes can be smaller in size than the error-detection code for the data packet as a whole. Although this means that the former error-detection codes are nominally unguaranteed, the nominally guaranteed nature of the latter error-detection code acts as a failsafe to ensure that no errors will escape detection in all likelihood.

I claim:

1. A method comprising:
  for each sub-data packet of a plurality of sub-data packets of a data packet, generating, by a transmitting device, an unguaranteed error-detection code for the sub-data packet from the sub-data packet, the unguaranteed error-detection code providing for detection of less than a threshold percentage of possible transmission errors of the sub-data packet;
  for the data packet, generating, by the transmitting device, a guaranteed error-detection code, the guaranteed error-detection code providing for detection of more than the threshold percentage of possible transmission errors of the data packet;
  transmitting, from the transmitting device to a receiving device, the data packet including the sub-data packets thereof, the unguaranteed error-detection codes for the sub-data packets, and the guaranteed error-detection code for the data packet;
  receiving, from the receiving device, indication that an error in a particular sub-data packet has been detected at the receiving device using the unguaranteed error-detection code for the particular sub-data packet; and
  in response to receiving the indication, resending the particular sub-data packet to the receiving device, without resending the data packet in an entirety thereof.

2. The method of claim 1, wherein the unguaranteed error-detection code for each sub-data packet is smaller in size than the guaranteed error-detection code for the data packet.

3. The method of claim 1, wherein the unguaranteed error-detection code for each sub-data packet is generated using a many-to-one technique against the sub-data packet, in that more than one unique data sequence within the sub-data packet can result in an identical error-detection code.

4. The method of claim 3, wherein the guaranteed error-detection code for the data packet is generated using a one-to-one technique against the data packet, in that each unique data sequence within the data packet results in a different error-detection code.

5. The method of claim 1, wherein the transmitting device is to transmit, to the receiving device, the data packet including the sub-data packets thereof, the unguaranteed error-detection codes, and the guaranteed error-detection code by transmitting the sub-data packets and the unguaranteed error-detection codes in an interleaved order.

6. The method of claim 1, wherein the guaranteed error-detection code provides a failsafe that a transmission error occurring within the data packet as a whole is detectable even if a given sub-data packet in which the transmission error occurred is not detectable from the unguaranteed error-detection code for the given sub-data packet.

7. A method comprising:
  receiving, by a receiving device from a transmitting device, a plurality of sub-data packets of a data packet, a unguaranteed error-detection code for each sub-data packet, and an guaranteed error-detection code for the data packet, the unguaranteed error-detection code for each sub-data packet providing for detection of less than a threshold percentage of possible transmission errors of the sub-data packet, the guaranteed error-detection code providing for detection of more than the threshold percentage of possible transmission errors of the data packet;
  for each sub-data packet, using, by the receiving device, the unguaranteed error-detection code for the sub-data packet to determine whether the sub-data packet is erroneous;
  in response to determining that the at least one and no more than a threshold number of the sub-data packets are erroneous using the unguaranteed error-detection codes for the sub-data packets,
    transmitting, by the receiving device, a request to the transmitting device to resend each sub-data packet that has been determined as erroneous using the unguaranteed error-detection code for the sub-data packet; and
  responsively receiving, by the receiving device from the transmitting device, a retransmission of each sub-data packet that the receiving device determined as erroneous.

8. The method of claim 7, further comprising:
in response to determining that more than the threshold number of the sub-data packets are erroneous using the received unguaranteed error-detection codes for the sub-data packets,
transmitting, by the receiving device, a request to the transmitting device to resend the data packet including the sub-data packets thereof.

9. The method of claim 7, wherein the threshold number of the sub-data packets is equal to a total number of the sub-data packets.

10. The method of claim 7, wherein for each sub-data packet that has been determined as erroneous, the receiving device transmits the request to the transmitting device to resend the sub-data packet as soon as the receiving device determines that the sub-data packet is erroneous.

11. The method of claim 7, further comprising:
using, by the receiving device, the guaranteed error-detection code for the data packet to determine whether the data packet is erroneous; and
in response to determining that the data packet is erroneous using the guaranteed error-detection code,
transmitting, by the receiving device, a request to the transmitting device to resend the data packet including the sub-data packets thereof.

12. The method of claim 11, wherein the receiving device determined, using the guaranteed error-detection code for the data packet, that the data packet is erroneous,
and wherein the receiving device determined, using the unguaranteed error-detection code for each sub-data packet, that no sub-data packet is erroneous.

13. The method of claim 11, wherein the guaranteed error-detection code for the data packet is used to determine whether the data packet is erroneous responsive to determining that no-sub data packet is erroneous using the unguaranteed error-detection code for each sub-data packet.

14. A system comprising:
a transmitting device to:
generate an unguaranteed error-detection code for each sub-data packet of a plurality of sub-data packets of a data packet, and a guaranteed error-detection code for the data packet, the unguaranteed error-detection code for each sub-data packet providing for detection of less than a threshold percentage of possible transmission errors of the sub-data packet, the guaranteed error-detection code providing for detection of more than the threshold percentage of possible transmission errors of the data packet;
transmit the data packet including the sub-data packets thereof, the guaranteed error detection codes for the sub-data packets, and the guaranteed error-detection code for the data packet; and
a receiving device to:
receive the data packet including the sub-data packets thereof, the guaranteed error detection codes for the sub-data packets, and the guaranteed error-detection code for the data packet;
for each sub-data packet, use the unguaranteed error-detection code for the sub-data packet to determine if the sub-data packet is erroneous;
in response to determining that a particular sub-data packet is erroneous using the unguaranteed error-detection code for the particular sub-data packet,
transmit a request to the transmitting device to resend the particular sub-data packet,
wherein in response to receiving the request, the transmitting device is to resend the particular sub-data packet to the receiving device,
and wherein the receiving device is to receive the particular sub-data packet as has been resent by the transmitting device.

* * * * *